United States Patent

[11] 3,602,517

[72] Inventor Petr J. Sehnal
Phoenix, Ariz.
[21] Appl. No. 37,427
[22] Filed May 13, 1970
[45] Patented Aug. 31, 1971
[73] Assignee Honeywell Information Systems Inc.

[54] RETRACTABLE HEAD MECHANISM
4 Claims, 6 Drawing Figs.

[52] U.S. Cl. ........ 274/4 R, 179/100.2 CA, 340/174.1 F
[51] Int. Cl. ........ G11b 5/54
[50] Field of Search ........ 274/4 A, 11 A; 179/100.2 CA, 100.2 MI; 340/174.1 F, 174.1 D

[56] References Cited
UNITED STATES PATENTS

| | | | |
|---|---|---|---|
| 3,056,606 | 10/1962 | Schueler | 274/17 |
| 2,673,249 | 3/1954 | Ericsson | 179/100.2 |
| 2,680,785 | 6/1954 | Franklin | 274/4 A UX |
| 2,721,743 | 10/1955 | Erickson | 274/4 A |
| 3,386,742 | 6/1968 | Deighton | 274/4 |
| 3,447,807 | 6/1969 | Mayer | 274/4 A |
| 3,509,554 | 4/1970 | Jensen | 179/100.2 CA X |

*Primary Examiner*—Leonard Forman
*Assistant Examiner*—Dennis A. Dearing
*Attorneys*—George V. Eltgroth, Edward W. Hughes and George R. Powers

ABSTRACT: A magnetic tape transport employing a head mounted on a retracting mechanism which is responsive to signals indicative of the operating mode of the transport wherein said mechanism is rotated to a tape confronting position when the transport is operating in read and write modes and is rotated from such confrontation for other operating modes.

INVENTOR.
PETR J. SEHNAL
BY
Warren F.B. Lindsley
ATTORNEY

RETRACTABLE HEAD MECHANISM

BACKGROUND OF THE INVENTION

This invention relates to magnetic tape transports and more particularly to the mounting arrangements for its transducers.

1. Field of the Invention

In modern data processing, information is commonly stored upon the magnetizable surfaces of tapes, drums, discs or other storage medium. The information data is stored in bits in spaced recording tracks formed along its surface. A recording head carrying a magnetic transducer is supported adjacent the magnetizable surface for recording information on or retrieving it from one or more of the tracks on its surface. It is of great importance in this type of storage system that the recording head be moved rapidly and accurately to selected positions with minimal deflection or bounce which might cause inaccurate readout or damaging contact of the recording head with the surface of the recording medium.

With reference to magnetic tape transports, it is desirable to retract the recording head from its position immediately adjacent the magnetizable tape during tape loading, rewind and other modes of transport operation not involved in reading, writing or erasing operations. If the recording head continues to engage the tape during such transport servicing or tape positioning operations, undue frictional wear of the recording head and tape occurs.

2. Description of the Prior Art

Heretofore, retractable head mechanisms have been provided for magnetic transports and other magnetic information storage devices. These mechanisms for magnetic transports have reduced a major portion of tape wear ordinarily caused by the transducer during changes in the operating mode of the transport. These mechanisms, however, have not effected rapid and accurate transducer movement to preselected positions without transmitting deflection, recoil, bounce or vibration to the transducer itself.

SUMMARY OF THE INVENTION

In accordance with the invention claimed, an improved retractable transducer mechanism is provided which accurately positions repeatedly a recording head in a selected position against a magnetizable medium. The mechanism holds the recording head in this selected position locked under predetermined bias or load each and every time the retractable mechanism places the recording head in the selected position.

It is, therefore, one object of this invention to provide an improved retractable transducer mounting mechanism which repeatedly and accurately positions a recording head in a selected position.

Another object of this invention is to provide an improved positioner for moving a recording head repeatedly to a given position adjacent a magnetizable surface having a plurality of recording tracks without transmitting deflection, recoil, bounce or vibration to the recording head itself.

A further object of this invention is to provide an improved retractable transducer mounting mechanism for a magnetic tape transport which reduces frictional wear of its recording head and associated magnetic tape.

A still further object of this invention is to provide an improved retractable recording head mechanism which is relatively easy to manufacture to close tolerances and economical to produce.

DESCRIPTION OF THE PREFERRED EMBODIMENT

Figure 1:
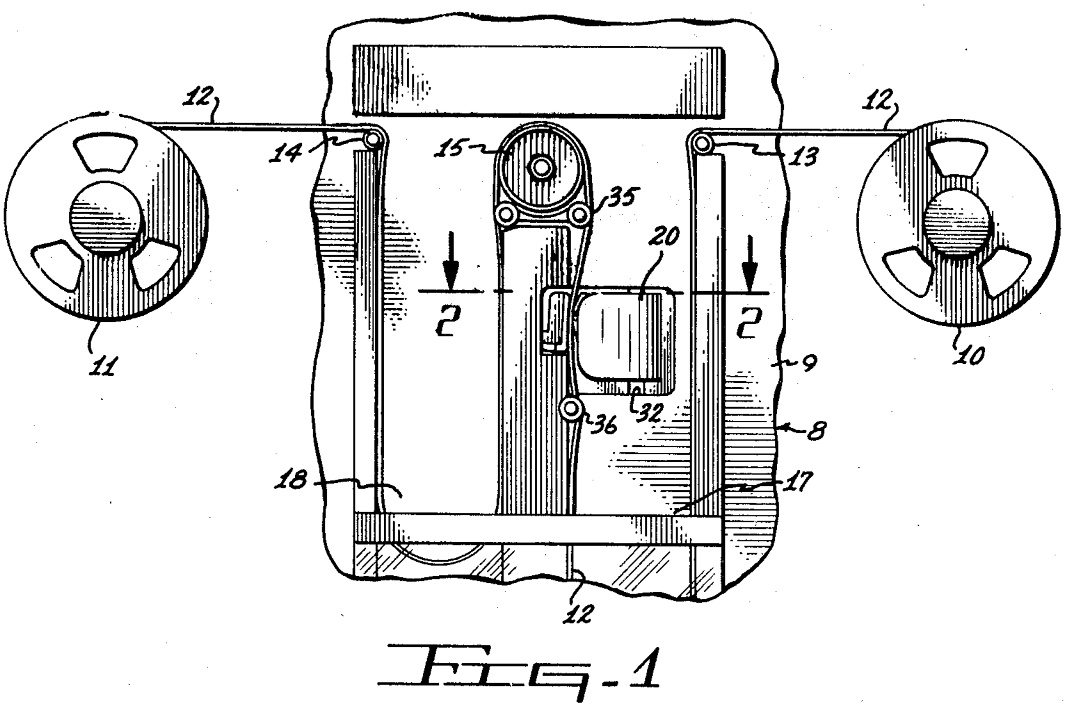
FIG. 1 is a simplified fragmentary front elevation of a tape transport illustrating the retractable head mechanism of this invention.

Referring more particularly to the drawings by characters of reference, FIG. 1 discloses a fragmentary front elevational view of a tape transport or handler 8. The mechanical components of the tape handler are mounted upon a panel 9 and includes a supply or drive reel 10, a takeup reel 11, and a suitable quantity of an elongated magnetic tape 12 made of a flexible plastic material employing a magnetic coating on one side thereof. Tape 12 passes from one reel to the other over a pair of rollers 13 and 14, and is driven by a capstan 15 which is connected to a suitable drive motor (not shown). The capstan, which drives tape 12 in either a forward or a reverse direction, is mounted between a pair of vacuum loop bins or columns 17 and 18. Tape from the supply reel 10 passes over roller 13, through vacuum bin 17, past an erase/write/read head 20, over capstan 15, through vacuum bin 18, over roller 14 to the takeup reel 11. The takeup and drive reels are given rotary motion by a pair of drive motors (not shown), suitably connected thereto.

Each of the vacuum bins 17 and 18 includes a vacuum source which causes the tape to be drawn therein forming a loop in each bin of variable length. As well known in the art, the vacuum bins buffer the shock of the tape, particularly during fast starting, fast stopping and reversing movements of the tape. It is clear that the low mass section of tape near capstan 15 can be more quickly accelerated and decelerated by the capstan than by the takeup and drive reels and their operating motors. For example, when the tape is first started in a forward motion, the tape loop in column 18 is shortened while the tape loop in column 17 grows larger. Eventually, as these reels are accelerated, they reach an overspeed and reestablish the correct lengths of loops in bins 17 and 18 and the reel motors are controlled to reestablish the reels at the correct operating speed to maintain the loops of a desired length. A similar lengthening and shortening of the loops and reestablishing of their correct lengths takes place when the tape is stopped and when it is accelerated in reverse motion. Control of the rotational motion of the takeup and drive reels to maintain the loops at their correct length is well known in the art.

Since the recording head 20 is ordinarily used only during the data reading, writing and erase operations of the tape transport, the recording head 20 is mounted so as to be moved away from the tape when the transport is operating in other modes, suchas,forexample,during loading, unloading and rewinding of the tape.

As more clearly shown in FIGS. 2–5, the recording head 20 is mounted on a turning plate 23, which is attached to a head-retracting mechanism 22. The head-retracting mechanism comprises a hinged plat 21 and turning plate 23 fixedly mounted on a rotatable shaft 24. A flexible lever arm 25 is fixedly secured at one end to one arm of the turning plate and pivotably connected at its other end to one end of arm 26 of a crank mechanism. The other end of arm 26 is pivotably connected to one end of arm 26′ of the crank mechanism. The other end of arm 26′ is connected to a rotatably mounted shaft 27. Shaft 27 is connected to a rotor of a suitable motor such as, for example, an alternating current motor 29. A cam 30, which operates a head-positioning indicator switch 31, is mounted on shaft 27. The retractable head mechanism described is mounted behind panel 9, with recording head 20 extending through an opening 32 in it.

Logic circuitry in a controller (not shown) for the transport, develops a signal to energize motor 29. The position of cam 30 determines the position of a contact arm 33 of switch 31 shown in FIG. 6 and, thus, determines whether the crank mechanism controlling the movement of the recording head 20 will cause the head to move to its retracted position, shown by dashed lines in FIG. 2, or move to its extended tape reading and writing position, shown by full lines in this figure. The motor will be energized until cam 30 rotates one-half of a revolution which causes the switch arm 33 of switch 31 to open a set of contacts that were closed and close a set of contacts that were open. This action generates a signal indicating that the recording head has completed its movement from one position to another and the logic then turns the motor off as hereinafter explained.

Figure 2:
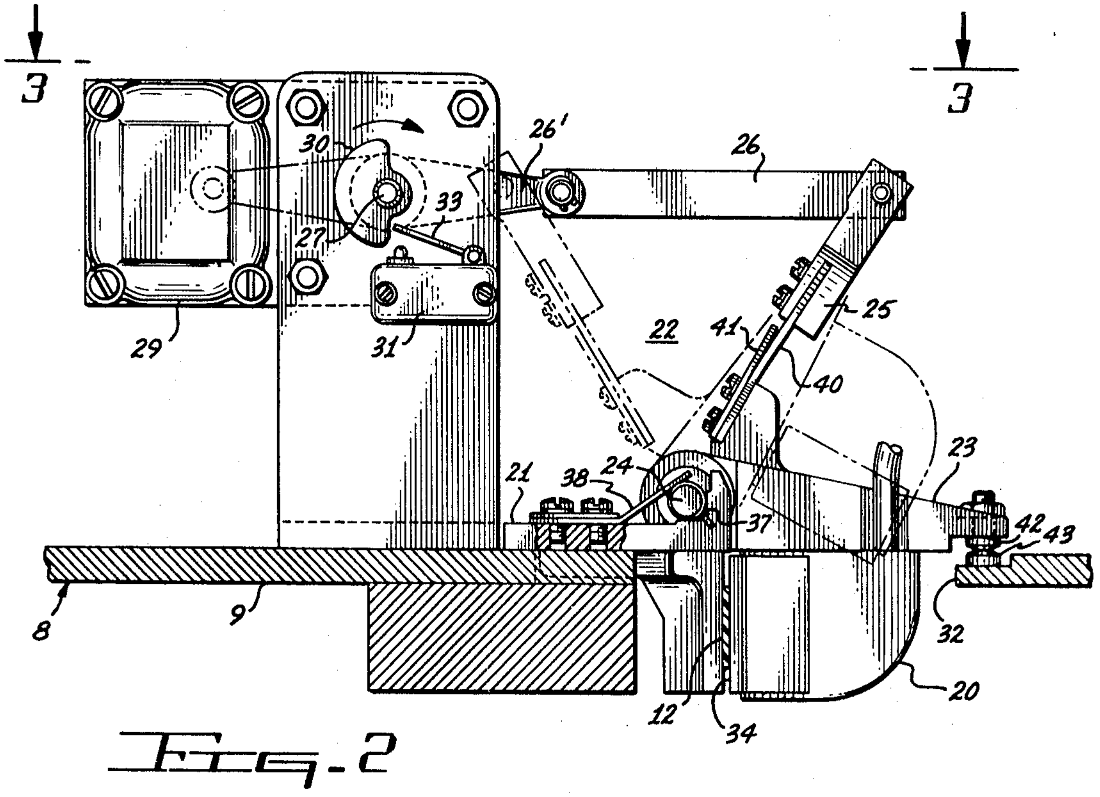
FIG. 2 is a plan view of the retractable head mechanism taken on the line 2—2 of FIG. 1.
Figure 3:
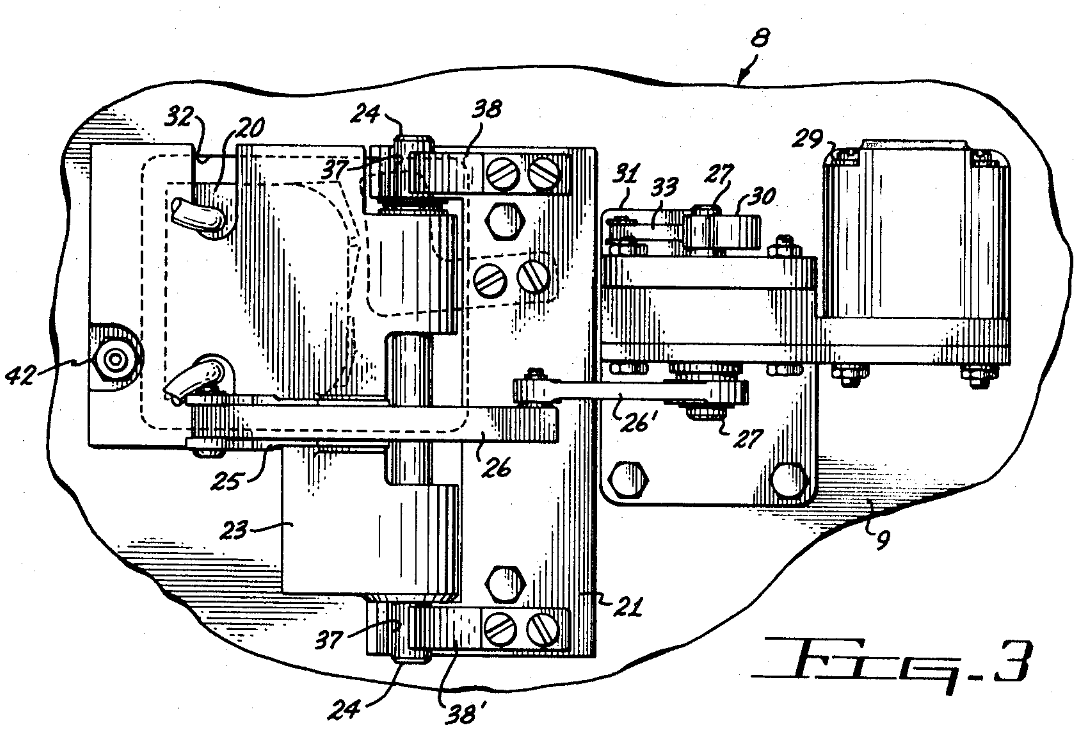
FIG. 3 is a back elevation of the retractable head mechanism taken on the line 3—3 of FIG. 2.

As noted in FIG. 2, the reading and writing surface 34 of the recording head 20, when in the extended or tape confrontation position, is aligned in a plane parallel to the flat side of tape 12 and transversely to the length of the tape. The tape continues to be guided by guides 35 and 36 when the recording head is in the retracted or tape avoidance position and does not follow the head, so that the tape and recording head are disengaged.

Figure 4:
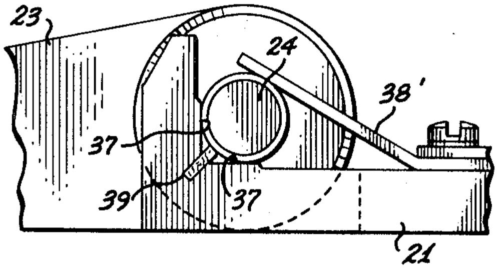
FIG. 4 is an enlarged fragmentary end view illustrating the mounting of the rotatable shaft.
Figure 5:
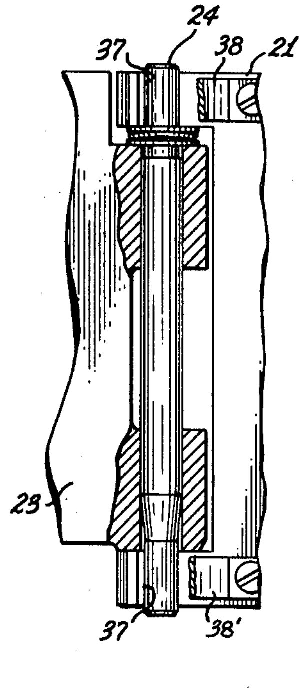
FIG. 5 is a simplified plan view partially broken away illustrating the rotatable shaft and the related bearing surfaces.

As shown in FIGS. 2 and 4, the hinge plate 21 forms a right-angled bearing 37 for shaft 24. Shaft 24 is biased into bearing engagement with plate 21 by a pair of leaf springs 38, 38', one end of which is bolted to plate 21, as shown in FIGS. 2–5. Bearing "play" or wear is compensated for by springs 38, 38', which continually force shaft 24 into contact with the bearing surfaces of plate 21, thereby assuring that the lateral positioning of the recording head across the longitudinal axis of tape 12 will occur accurately in the same place each time the recording head is moved to its extended position by motor 29. FIG. 4 illustrates more clearly the bearing structure and also shows a felt oil bearing means 39 well known in the art.

In order to accurately position the recording head in a plane parallel to the flat side of the tape each time the retractable mechanism is actuated to head extended position, a leaf spring 40 is provided as a part of flexible member 25. The leaf spring is bolted at one end to one arm of the turning plate 23 and at the other end to that portion of flexible member 25 which is pivotably connected to arm 26 of the crank mechanism. A rigid backup member 41 is bolted to the same arm of the turning plate 23 that leaf spring 40 is bolted to on the left side of the leaf spring, as shown in FIG. 2, and restricts the flexing of the leaf spring when the recording head is moving to the retracted position. The turning plate 23 holds a stop button 42, threadedly mounted on the end of its other arm, against a cooperating stop button 43 mounted within an aperture in panel 9 as shown in FIG. 2 when the retractable mechanism is in recording head extended position. Flexible member 25 is under constant load or spring bias when the retractable mechanism is in the recording head extended position adjacent tape 12. The position of arms 26, 26' of the crank mechanism keeps the crank mechanism locked against a reasonable opposing force introduced by the magnetic head. Stop buttons 42 and 43, together with the flexible member 25, accurately control the reading and writing position of the recording head with reference to the plane of the surface of the tape being read or written on.

Ideally, the tape path should be exactly vertically across the recording head with no vibration when the tape is moving. If this was actually the operating condition, all bits recorded on the tape in a frame extending laterally across the longitudinal axis of the tape would be parallel to a centerline through the recording head and all the bits in a frame would be transversed at the same instant. Unfortunately, this is not the case. Mechanical tolerances and mounting structures that guide the tape alter the tape path across the recording head by an amount referred to as "skew." This "skew" is also effected by the mounting of the recording head and when the recording head is retractably mounted the skew problem may be further aggravated.

In order to control and greatly reduce the "skew" problem created by the use of a retractable recording head mechanism, the new and improved claimed structure was conceived. This improved retractable recording head mechanism provides the dual function of controlling the lateral positioning of the recording head with reference to the tape path through the tape transport and the plane withing which the recording head is positioned with reference to the surface of the tape being read or written on.

Figure 6:
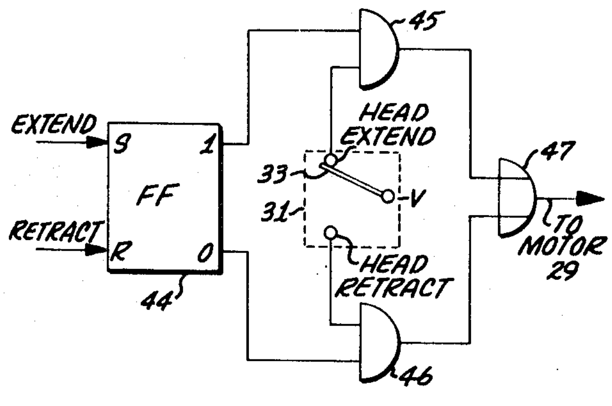
FIG. 6 is an illustration of the recording head movement logic.

FIG. 6 illustrates in more detail the switch recording head movement logic wherein logic EXTEND and RETRACT signals are applied to the set and reset input terminals of a flip-flop 44. Flip-flop 44 is a device having two stable states of operation. As utilized in the subsequent discussion, the flip-flop has two input terminals, a set(s) and a reset(r) terminal, and two output terminals, a one terminal and a zero terminal. When a high level signal is applied to the set(s) terminal of the flip-flop, the one output terminal is at a high level and the zero output terminal is at a low level. The flip-flop will remain in this state until a high level signal is applied to the reset(r) terminal of the flip-flop, at which time the one output terminal will switch to the low level and the zero terminal to the high level. The flip-flop will now remain in the reset state until such time as a high level signal is applied to the set(s) input terminal.

As shown in FIG. 6, the one output terminal of flip-flop 44 is connected to one of the input terminals of an AND gate 45. The other input terminal of AND gate 45 is connected intermittently through switch arm 33 of switch 31 to a high or a low level potential, depending on the position of cam 30. The zero output terminal of flip-flop 44 is connected to an input terminal of AND gate 46. The other input terminal of AND gate 46 is connected intermittently to a high or a low lever potential by switch arm 33 depending again upon the position of cam 30. The output signals of AND gates 45 and 46 are each connected to a different input terminal of OR gate 47. The output terminal of OR gate 47 is connected to motor 29.

AND gates 45 and 46 are defined as multiple input, single output devices. All input signals to an AND gate must be at a relatively high level in order for the output signal to be of a relatively high level. Should any of the input signals to the AND gates be of a relatively low level signal, the output signal of the AND gates will be a relatively low level signal. An OR gate is defined as a multiple input, single output device which provides a relatively high level output signal upon the application of a relatively high level signal to any one of its input terminals.

When the recording head is in the head extended position, as shown in full lines in FIG. 2, and it is desired to retract the recording head to its retracted position shown in dashed lines in FIG. 2, a high level signal is generated and applied to the reset terminal of flip-flop 44. At this time conjunction occurs in AND gate 46 since both of its input terminals are at a relatively high potential level. The output signal from AND gate 46 is transmitted through OR gate 47 to energize motor 29 to retract the recording head 20. During this operation, cam 30 moves switch arm 33 causing a negative or relatively low level potential to be applied to one of the input terminals of AND gate 46 and a relatively high level potential to be applied to one of the input terminals of AND gate 45, thus removing the energizing signal applied to the motor by OR gate 47. When it is desired to extend the recording head to its reading and writing position, a relatively high level signal is transmitted to the set terminal(s) of flip-flop 44. A relatively high level signal is then transmitted to AND gate 45. Conjunction occurs in AND gate 45 and a relatively high level output signal is transmitted from AND gate 45 through OR gate 47 to motor 29 causing motor 29 to extend the recording head to its read and write position. Cam 30 again causes switch arm 33 to move back to the position shown in FIG. 6, thus removing the energizing signal applied to the motor by OR gate 47.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles.

I claim:

1. In a magnetic tape transport having a recording head and a movable magnetic tape for recording and storing information, the combination comprising: a retractable mechanism for bringing a recording head into recording confrontation with the tape and for retracting the recording head from such confrontation to a tape avoidance position said retractable mechanism comprising a rotatable shaft, a bearing member having a right angle bearing structure for receiving said shaft longitudinally therein, said shaft at least being supported by said bearing member at spaced portions along the length of said shaft, a leaf spring biasing said shaft into engagement with said bearing structure, an elongated member fixedly mounted on said shaft for rotation therewith, a plate member fixedly mounted to said elongated member, said plate member having extensions on both sides of the rotational axis of said shaft, one of said extensions having said recording head mounted thereon, said recording head being rotatable either into the tape confrontation position or into the tape avoidance position upon appropriate rotation of said shaft, said positions defining planes parallel to the rotational axis, a second of said extension at the other of said sides comprising a flexible arm for biasing under load the recording head to a stop member, said stop member retaining the recording head in an identical tape confrontation position each time the recording head confronts the tape, and drive means coupled to one end of said flexible arm for operation of said retractable mechanism to cause confrontation of the tape during reading and writing operations of the transport and to effect retraction of the recording head during other given modes of operation of the transport.

2. The magnetic tape transport of claim 1 wherein said drive means comprises:

- a crank mechanism;
- unidirectional rotating means for rotating said crank mechanism; and
- means for fastening said crank mechanism to said flexible arm, whereby said rotating means causes reciprocating motion via said crank mechanism to cause the flexible arm to rotate the transducer into and out of the tape confrontation position.

3. A head positioning assembly for transducer positioning in a magnetic tape transport mechanism comprising in combination:

- a panel;
- a rotatable shaft;
- a bearing member fastened to said panel having a right-angle bearing structure for receiving said shaft longitudinally therein, said shaft at least being supported by said bearing member at spaced portions along the length of said shaft;
- a leaf spring fastened to said panel biasing said shaft into engagement with said bearing member;
- an elongated member fixedly mounted on said shaft for rotation therewith;
- a plate member fixedly mounted to said elongated member, said plate member having extensions extending from the peripheral of said shaft, one of said extensions having the transducer mounted thereon;
- a flexible lever fastened on one end to a second extension of said plate member;
- a stop member fastened to said panel; and
- drive means applied to the other end of said flexible lever for rotating the transducer into a tape confrontation position and for retracting the transducer from such confrontation to a tape avoidance position, said positions defining planes parallel to the rotational axis of said shaft;
- said stop member retaining the recording head in an identical tape confrontation position each time the transducer confronts the tape.

4. The head-positioning assembly of claim 3 wherein said drive means comprises:

- a crank mechanism;
- unidirectional rotating means for rotating said crank mechanism; and
- means for fastening said crank mechanism to the other end of said flexible arm whereby said rotating means causes reciprocating motion via said crank mechanism to cause the flexible arm to rotate the transducer into and out of the tape confrontation position.